(No Model.) 6 Sheets—Sheet 1.
H. S. BECKER.
MACHINE FOR CUTTING KNIT FABRICS.
No. 464,952. Patented Dec. 15, 1891.
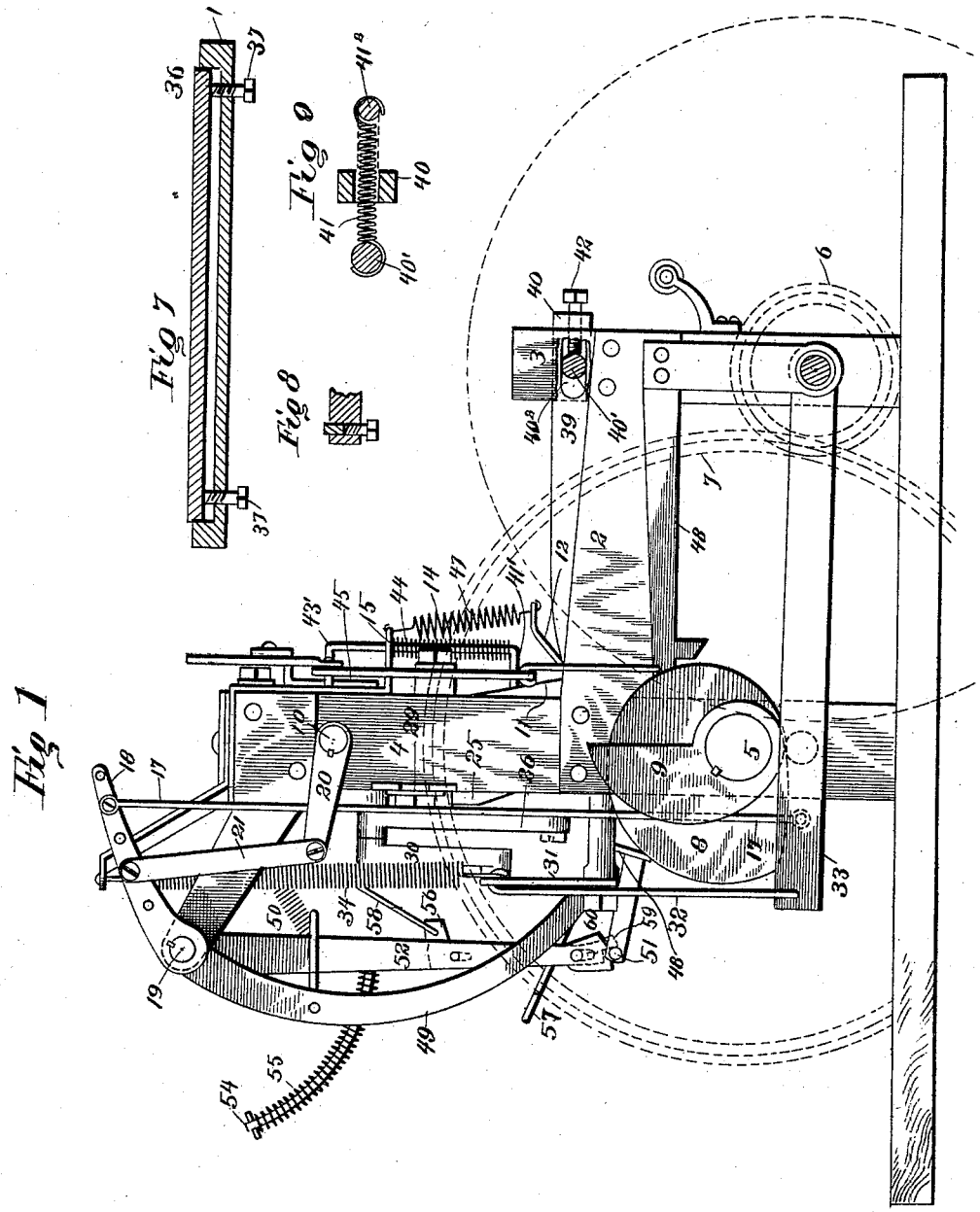
Witnesses
C. C. Burding
H. E. Peak.
Inventor
H. S. Becker
per O. E. Duffy
Attorney.

(No Model.) 6 Sheets—Sheet 2.
H. S. BECKER.
MACHINE FOR CUTTING KNIT FABRICS.
No. 464,952. Patented Dec. 15, 1891.
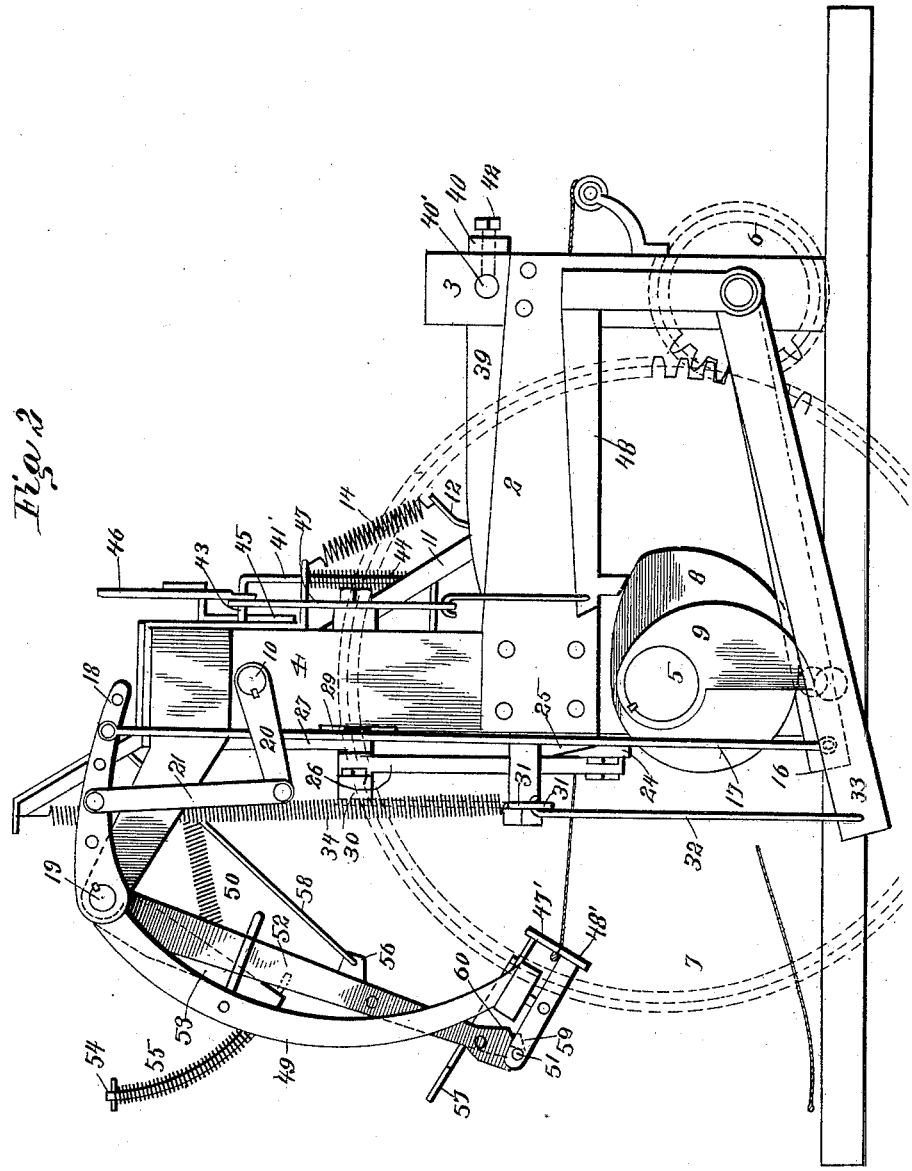
Witnesses
C. C. Burdine,
Hubert E. Peck.
Inventor
H. S. Becker
per O. E. Duff,
Attorney
THE NORRIS PETERS CO., PHOTO-LITHO., WASHINGTON, D. C.

(No Model.) 6 Sheets—Sheet 3.
H. S. BECKER.
MACHINE FOR CUTTING KNIT FABRICS.
No. 464,952. Patented Dec. 15, 1891.
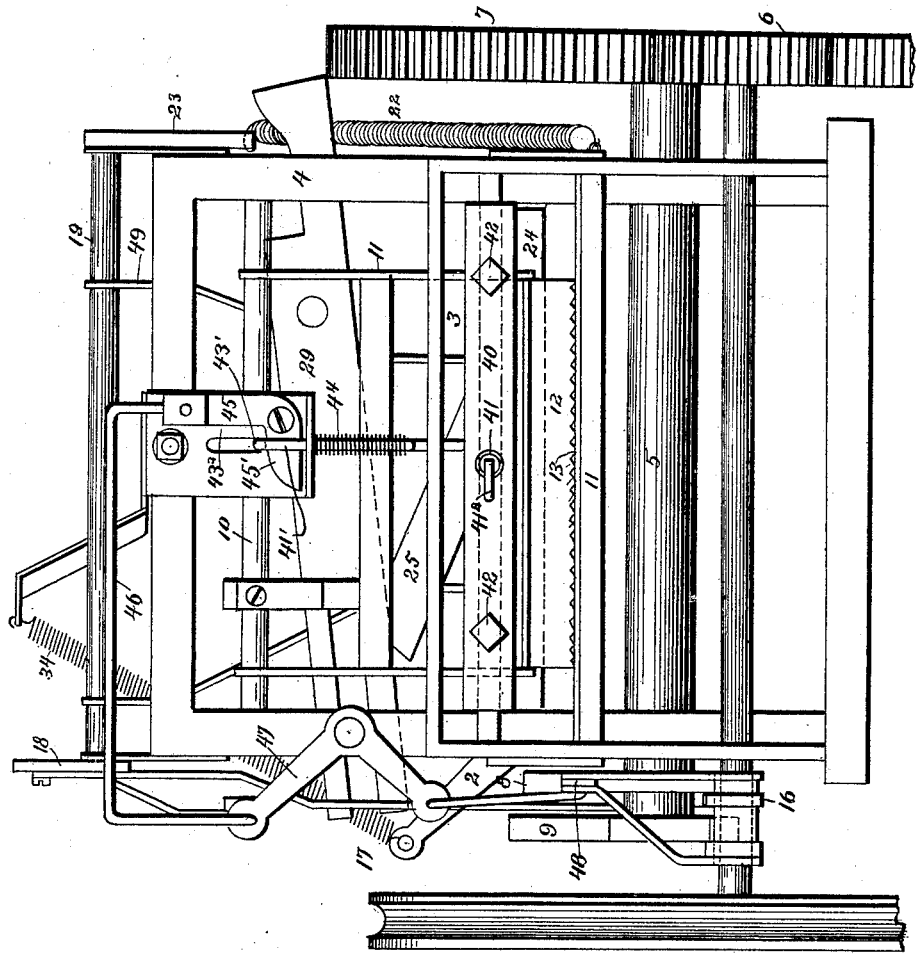
Witnesses
C. C. Burding
H. E. Peaks
Inventor
H. S. Becker
per O. E. Duffy
Attorney (No Model.) 6 Sheets—Sheet 4.
H. S. BECKER.
MACHINE FOR CUTTING KNIT FABRICS.
No. 464,952. Patented Dec. 15, 1891.
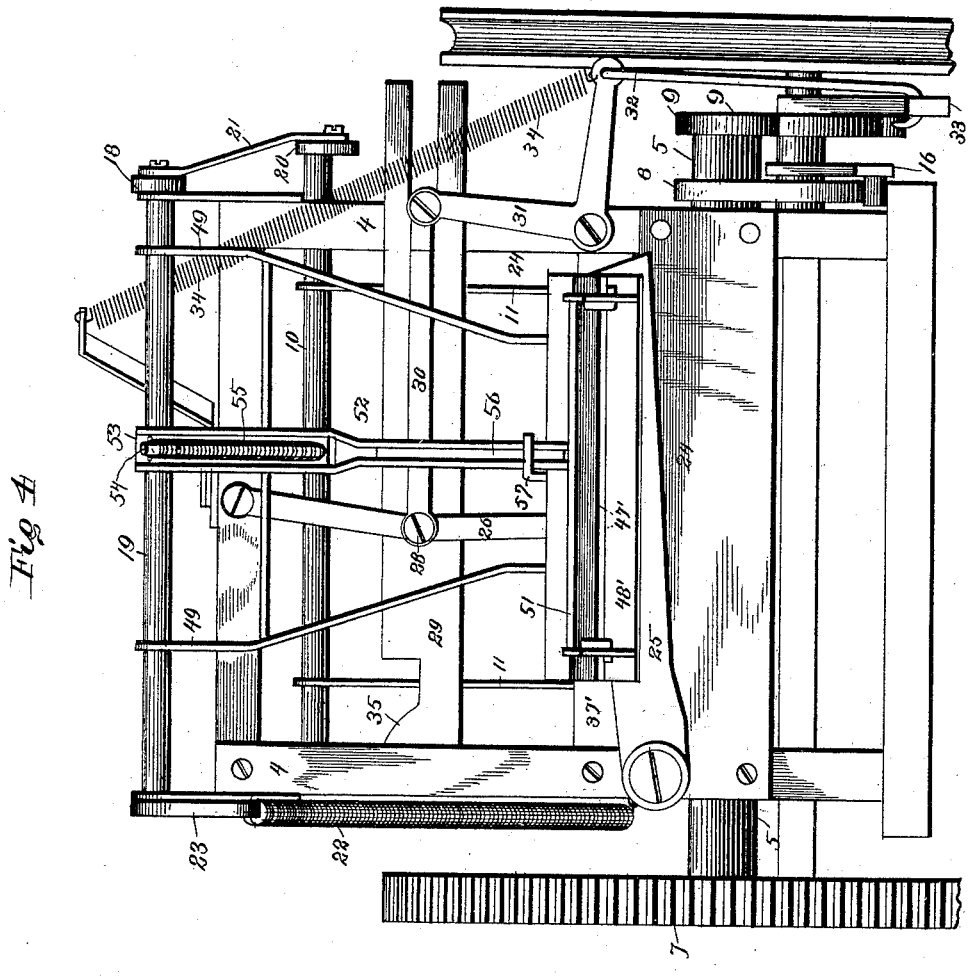

(No Model.) 6 Sheets—Sheet 5.
H. S. BECKER.
MACHINE FOR CUTTING KNIT FABRICS.
No. 464,952. Patented Dec. 15, 1891.
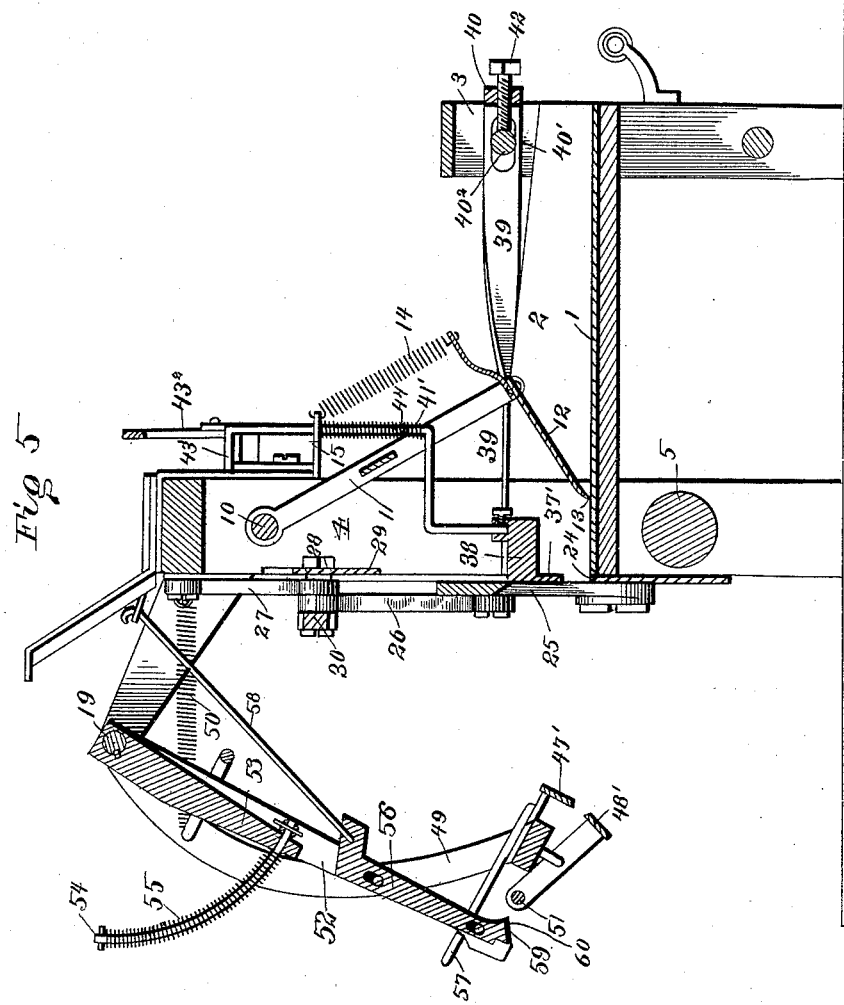
Witnesses
C. C. Burding
C. M. Werle
Inventor
H. S. Becker
per O. E. Duff
Attorney

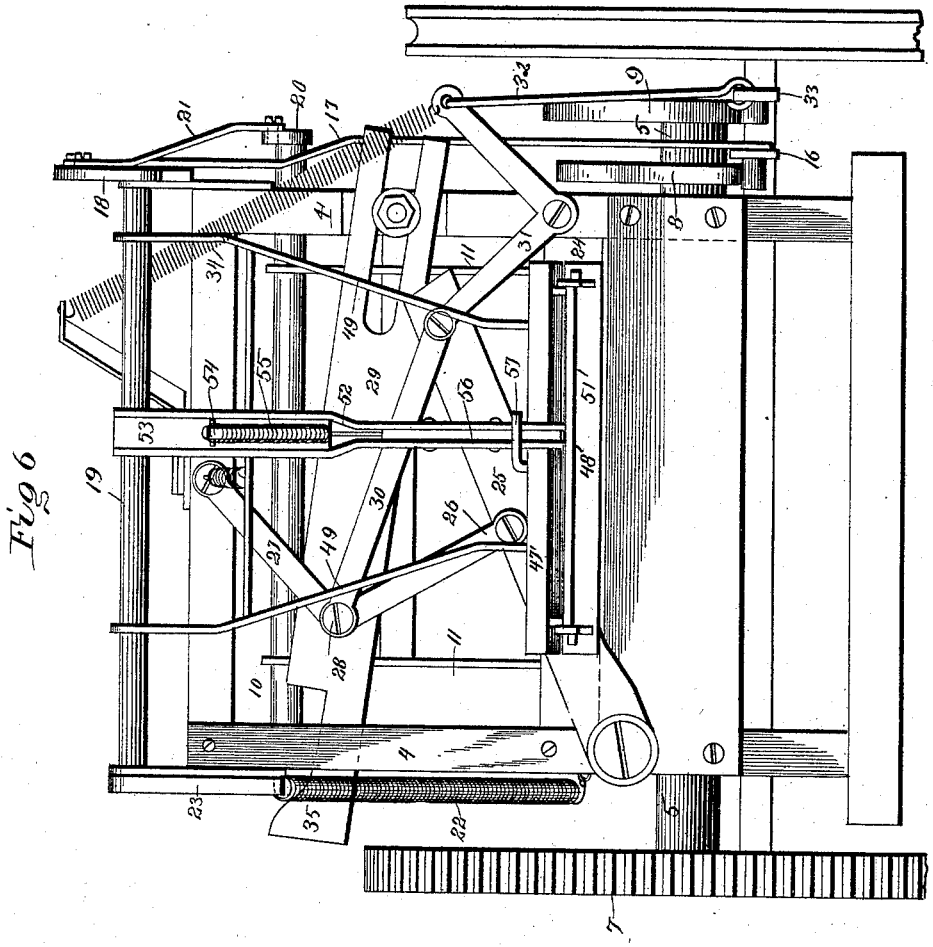

UNITED STATES PATENT OFFICE.

HENRY S. BECKER, OF CHARLOTTESVILLE, VIRGINIA, ASSIGNOR OF ONE-HALF TO IDA A. SALTSMAN, OF SAME PLACE.

MACHINE FOR CUTTING KNIT FABRICS.

SPECIFICATION forming part of Letters Patent No. 464,952, dated December 15, 1891.

Application filed March 3, 1891. Serial No. 383,570. (No model.)

*To all whom it may concern:*

Be it known that I, HENRY S. BECKER, of Charlottesville, in the county of Albemarle and State of Virginia, have invented certain new and useful Improvements in Cutting-Machines; and I do hereby declare that the following is a full, clear, and exact description of the invention, which will enable others skilled in the art to which it appertains to make and use the same, reference being had to the accompanying drawings, and to the figures of reference marked thereon, which form part of this specification.

This invention relates to certain improvements in machines for cutting fabrics.

The object of the invention is to provide an improved automatic machine for cutting rapidly, neatly, and uniformly ribs for knitted goods, such as cuffs or wristbands. These and other objects are accomplished by and my invention consists in certain novel features of construction and in combinations of parts more fully described hereinafter, and particularly pointed out in the claims.

Referring to the accompanying drawings, Figure 1 is a side elevation of the machine. Fig. 2 is an elevation from the same side, parts being shown in different positions. Fig. 3 is a front elevation. Fig. 4 is a rear elevation. Fig. 5 is a longitudinal central vertical section. Fig. 6 is a rear elevation, the parts being in different positions from that of Fig. 4. Figs. 7, 8, and 9 are sectional views of detail parts.

In the accompanying drawings, 1 is the work table or platform of the machine, across which the material to be cut travels. This table is rigidly and securely mounted in suitable supports, and preferably has the side piece 2. A frame 3 extends over and above the front end of this table. Strong metal frame 4 extends up above and over the rear end of the table, and consists of the side bars and upper cross-bar.

The main drive-shaft 5 of the machine extends beneath the table, and is journaled in and extends through the side pieces of the frame 4. At one end this shaft is driven by suitable gearing, as the gearing 6 and 7. At its opposite end the shaft is provided with the two cams 8 and 9 for the purposes fully set forth hereinafter.

A feed-actuating shaft 10 is mounted in the frame 4 above the operating-table and parallel with the main shaft. Suitable mechanism, actuated by this shaft 10, is arranged to feed the material to be cut across the work-table. This mechanism preferably consists of the two or more arms 11, secured to shaft 10, and connected by the cross-bar, and at their lower ends having the feeder 12 at its ends loosely journaled in the lower ends of said arms 11, so that its lower free edge, provided with the pivoted feeding projections or fingers 13, can be held yieldingly pressed down upon the upper surface of the table by means of the spring 14, secured to an arm extending rearwardly from said feeding-plate 12 and to the bracket 15, depending from the upper end of the frame 4.

The feeding-fingers extend toward the rear edge of the table, as shown, so that when the shaft 10 is rocked in one direction said feeder 12 and its fingers 13 will move over the surface of the table toward the rear edge thereof, the spring 14 throwing projections 13 into the fabric, and when the feed-shaft is rocked in the opposite direction the said fingers will move rearwardly over the surface of the table without moving the fabric lying thereon, sliding over the same. This feeding device is driven by cam 8, which operates on the lever 16, pivoted at one end and provided with a lateral stud or roller bearing against the under side of said cam and having its free end connected by connections 17 to crank-arm 18 on one end of the counter-shaft 19, mounted in suitable arms from the upper end of frame 4, so as to be located above and in rear of the table. The feed rock-shaft 10 has a crank-arm 20 on its end, which is connected by link 21 with said crank 18 of shaft 19, so that when the lever 16 is depressed by cam 8 crank 18 will be thrown down, thereby throwing down crank 20 and rocking the feed-shaft so as to throw back the feeding device in position to feed, and as the cam 8 rotates to allow lever 16 to gradually swing up the shaft 19 is rocked in the opposite direction and turned to its normal position by spring 22, connected therewith through the medium of mechanism before described to move the feed mechanism forwardly and feed forward the desired amount of fabric over the table and from a reel, as shown.

At the rear edge of the table a stationary vertical knife-blade 24 is secured with its upper edge substantially flush with the upper edge of the table. A movable blade 25 is provided and pivoted to one end of the stationary blade, so as to engage therewith and cleanly and neatly sever the fabric which is fed between the blades. The movable blade of the shears or cutting mechanism is swung or operated by a pair of toggle-links 26 and 27, the lower end of link 26 being pivoted to the movable blade and the upper end of link 27 being pivoted to the upper end of frame 4. These toggle-links are pivoted together by means of the pin 28, projecting from and carried by the inclined sliding plate 29, confined to the sides of the frame 4 and having its sliding movement limited by suitable means, such as slots or shoulders and stops. A link 30 extends from pin 28 to one arm of vertically-moving bell-crank lever 31, having its opposite end connected by connection 32 to the free end of the lever 33, pivoted at one end to frame 3, and provided with a lateral stud or roller between its pivoted end and free end bearing on the under edge of cam 9, so as to be depressed by said cam. A suitable retractive spring 34 is secured to one arm of said bell-crank lever 31 to hold the parts connected therewith, particularly the movable blade of the cutting apparatus, in their normal and raised positions, as shown in Fig. 4.

The cams 8 and 9 are so arranged that when the feeding mechanism feeds forward the fabric the movable blade is raised and after the fabric has been fed forward the cam 9 depresses the lever 33, and thereby operates the bell-crank lever 31 to draw down the plate 29 and expand the toggle-links and throw down the movable blade and shear or cut off the fabric cleanly and easily, the stationary and movable blades acting together as a pair of scissors or shears. One end of the sliding blade 29 is confined by means of the slot and bolt, while the other end of said blade extends through a vertical slot (see Fig. 5) in one side of the frame 4, and at its upper side is provided with an inclined edge 35, which engages the upper edge of said slot when the blade 29 is moving forward to the limit of its stroke, and thereby forces down the said plate, and hence forces down the cutting-blade completely, so as to engage the stationary blade throughout its entire length.

Suitable grasping and holding mechanism is provided to hold the fabric while being cut and to regulate the lengths cut off, said mechanism preferably consisting of the vertically-adjustable lower bar 36, located in and parallel with the rear edge (see Figs. 7 and 8) of the table along the rear edge of the stationary knife and provided with screws 37, whereby it can be raised and lowered in the slot in the upper side of the table, and a movable upper gaging and pressure bar 37' to correspond with said bar 36, secured to the edge of cross-bar 38, carried by the arms 39, extending above the table and connected at their rear ends by cross-bar 40 in front of frame 3, the arms having longitudinal slots $40^2$ therein near their rear ends, through which the horizontal stationary rod 40', carried by frame 3, extends, so that the movable pressure-bar and the frame carrying the same swing vertically on said rod. A spring 41 (in this case attached to rod $41^2$, upon which the pressure-bar frame swings and to the rear cross-bar of said frame, see Fig. 9) constantly tends to draw the movable pressure-bar close up against the cutting-knives, and screws 42 are provided and arranged, as shown, to regulate the distance between the movable pressure-bar and the cutting-blade. A rod 41' extends up from the free end of the pressure-bar frame through the bracket 15, and has a bent end or arm 43', extending into a vertical slot $43^2$ in said bracket. A spring 44 surrounds said rod and yieldingly holds the same down, so as to constantly tend to force down the pressure-bar upon the fabric. This pressure-bar-controlling rod is raised to lift the pressure-bar to allow the fabric to be fed forward by means of bell-crank-lever 45, having a cam-shaped end 45', located under said bent end 43' of the pressure-bar-controlling rod and having its opposite end connected by rod 46 to one arm of bell-crank lever 47, which has its other arm connected to the free end of vertically-movable lever 48, bearing down upon the edge of and raised and lowered by a cam 8, so that when said lever 48 is raised its full height the pressure-bar will be raised, so that the fabric can be fed forward; but when the fabric has been fed forward a proper amount said cam turns so that the lever 48 can drop, whereby the spring 44, acting on the pressure-bar-controlling rod, forces the pressure-bar down and holds the cloth, while the cutter-blade moves down and severs the same.

The shaft 19 carries a suitable drawing and holding mechanism, which moves forward to engage the free edge of the fabric being fed forward between the cutting-knives, and draws said fabric out and holds the same taut and tightly while being cut off. This mechanism, preferably consisting of a clutch or clamp to grasp the edge of the fabric, is composed of a rigid jaw 47' and under movable jaw 48', the clamp being carried by the two loose arms 49 and depending from the shaft 19. The movable jaw just mentioned consists of a pair of side pieces at their front ends rigidly carrying the jaw proper, at their rear ends connected by a cross-bar 51, and between their ends pivoted in suitable bearings from the under side of the cross-bar carrying the rigid jaw, and so that the normal condition of the clamp or grip will be open, as shown in Fig. 5. This clamping device is actuated and drawn back by means of the arm 52, extending down from the shaft 19, preferably composed of two parallel plates loose on said shaft and secured together a suitable distance apart, and at their upper ends having between them the short arm 53, rigid on the shaft and connected to operate the loose arm 52 by means of the curved rod 54, rigid with said two plates of arm 52 and extending loosely through an aperture in the operating-arm 53 and provided with an expansive coil-spring 55, bearing on the rear side of said arm 53 and against a stop on the outer end of said curved rod 54. Thus the arm 52 is caused to swing with the rock-shaft 19 and has a spring or yielding connection with said shaft, for the purpose herein described. The clutch is drawn back by operating-arm 53 against tension of spring 50 by means of the curved arm 57, rigid with the clutch and provided with the bent end extending around the rear edge of arm 52, so as to be engaged by arm 52 when the same moves back, and thereby draw back the clamp with it.

A vertically-movable trip or trigger 56 is located and adapted to project below lower end of arm 52 and lock the clamp closed. The trigger 56 is controlled by means of the connection 58, connected to upper end of said trip and to the frame 4, so that when the clasp is thrown back its full stroke by its controlling-arm 52 the connection 58 will draw up the trigger and release its lower beveled and shouldered end 59 from the rear bar 51 of the lower jaw of the clasp, allowing said jaw to drop and open the clasp. (See Fig. 5.) When the shaft 19 is rocked in the opposite direction by cam 8, the fabric is fed forward, the pressure-bar and the cutter-blade are raised, and the clasp-controlling arm swings in, allowing the open clasp to move in under the influence of the spring 50 to the limit of its movement with the outer edge of the fabric fed forward between its open jaws, and as the clasp-controlling arm swings in its lower beveled end 60 strikes the upper side of the rear cross-bar 51 of the lower jaw, thereby forcing up said jaw and tightly clamping the fabric between the two jaws of the clasp, and said cross-bar also engages the front beveled side of shoulder 59 of vertically-movable trigger 56, (the connection 58 allowing the trigger to project below the end of the arm 52 when in this position,) and lifts said trigger, which drops down in front of said cross-bar and holds the clasp locked. (See Fig. 2.) The shaft 19 then rocks in the opposite direction and the clasp draws out the fabric until the welt therein engages the pressure-bar. The clasp holds the fabric taut until the cutter has descended and cut off the same, the clasp-controlling arm continuing to move back until its limit of outward swing is reached, and the clasp-lock or trigger then draws up by connection 58, allowing the clasp to open and drop the section of fabric or rib cut off. The clasp-controlling arm is here constructed to move back a certain distance every stroke; but of course the lengths of fabric to be cut off sometimes vary, and in order to provide for such varied strokes of the clasp the spring connection before described is provided between the clasp-controlling arm 52 and the shaft 19, so that the short arm 53, rigid on the shaft 19, can move out the same distance every stroke, even if a welt in the fabric-engaging pressure-gage bar prevents the clasp and loose portion of arm 52 moving out the full-length stroke with the arm 53, the arm 53 moving out its full stroke by compressing spring 55. (See Fig. 2.)

The stroke of the feeding mechanism can be varied by changing the pivotal point between link 21 and crank-arm 18 through the medium of the series of apertures and removable crank-pin, so that the length of movement of crank-arm 20 of the feed rock-shaft can be varied, thereby varying the backward movement of the feed bar or plate.

It should be observed that the cams 8 and 9 are preferably so arranged that the cutting apparatus is open and gage-bar raised and the drawer and holder open and in receiving position just in rear of the cutting apparatus when the feeder is feeding the rib-strip forward through the cutting apparatus into the drawer and holder, which then clasps the same and draws it through the cutting apparatus, the gage-bar in the meantime having dropped so that the rib-strip and drawer and holder are stopped by a welt of the strip engaging the gage bar or bars. The pivotal cutter then descends and shears off the section of rib just at or close to the welt behind the gage-bar. The drawer and holder then releases and drops the piece cut off.

The machine is entirely automatic in action, and all of the various mechanisms thereof are driven from the single continuously-rotating drive-shaft. Of course the shaft, or, in fact, the various mechanisms, can be actuated in any desired manner, the preferred manner only being here shown.

The ribs, wristbands, &c., for knitted goods—such as hosiery and underwear—are ordinarily formed in strips with the transverse welts therein, which form the outer edges, beads, or ribs, when secured upon the ends of the garment. It requires much time and great labor to properly cut these strips so that a welt will be at one edge thereof; but by my improved machine the strip is automatically fed through the machine and cut into the proper strips and the strips then dropped. While the machine is more particularly intended for this use it is by no means limited to such purpose, but can be employed where applicable for cutting other material.

It is evident that various changes and modifications might be made in the form, construction, and arrangements of the parts described without departing from the spirit and scope of my invention. Hence I do not limit myself to the construction, form, and arrangements herein set forth; but

What I claim is—

1. In a cutting-machine, the combination of a work-table, a cutting apparatus, a vertically-movable pressure-gage bar along the inner side of the cutting apparatus, a vertically-movable and horizontally-adjustable frame, screws whereby said frame carrying said bar can be adjusted horizontally to vary the distance between said bar and the cutting apparatus, and operating connections by which the frame and said bar are raised and lowered at the proper periods, substantially as described.

2. In combination, a work-table, a cutting apparatus, a frame above the table, a rock-shaft mounted therein, operating connections to rock said shaft, arms depending from said shaft, the feeder-bar at its ends journaled in the lower ends of said arms and having the fabric grasping or engaging devices, and a spring to hold said grasping devices in engagement with material on the table, substantially as described.

3. In a cutting-machine, the combination of a work-table, a drive-shaft having a cam, a frame above such table, a shaft mounted in such frame and having a crank-arm, a lever held against such cam, so as to be rocked thereby, connections between such crank-arm and lever, the swinging arms carried by and depending from such rock-shaft, and a rocking spring-controlled feed-plate mounted in the lower portion of such arms.

4. In combination, a work-table, a frame extending up from such table, cutting apparatus, a vertically-movable pressure-bar at the inner side thereof, a controlling-rod extending up from said bar and having a lateral arm or projection, a guide carried by said frame for such rod, a spring forcing said bar down, a rocking lever mounted on such frame and provided with suitable means, as a cam-edge, for raising said rod and the bar against tension of the spring and against which said spring holds said projection or arm of the rod, and connections from the operating-shaft, whereby said lever is rocked, substantially as described.

5. In a cutting-machine, a work-table, a cutting apparatus, a pressure-gage bar, a swinging frame, at its movable end carrying such gage-bar and provided with horizontal slots in its opposite portion, a stationary horizontal rod forming the fulcrum of said frame and passing through such slots, a spring drawing said frame horizontally, means, such as screws, to adjust such frame in the opposite direction, a spring drawing said frame vertically, and means to operate the frame oppositely at intervals, all combined substantially as described.

6. In a cutting-machine, a work-table, a frame extending above the table, the stationary blade, the corresponding vertically-swinging pivoted blade, the operating toggle-links for said pivoted blade pivoted to the blade and to said frame, a pitman or link to expand said toggle-links, a driving-shaft to operate such pitman, means controlled by said shaft to expand the toggle to throw down the pivoted blade, and a spring to draw up said blade.

7. In a cutting-machine, the combination of the work-table having the upright frame, a stationary blade, the corresponding pivoted blade, the transverse sliding plate above the pivoted blade, the toggle-links pivoted to the pivoted blade and to said plate and the frame, and means for operating said parts, substantially as described.

8. In a cutting-machine, the combination of a work-table, a frame extending above the table, a drive-shaft having a cam, a stationary cutting-edge, a corresponding vertically-swinging pivoted blade, the toggle-links controlling said blade, the bell-crank lever having one end connected by a link to said links at the pivotal point between them, the lever arranged to be depressed by said cam and connected to the other end of said crank-lever.

9. In a cutting-machine, the combination of cutting apparatus, a frame, and the herein-described drawer and holder comprising a rock-shaft in the frame, means for rocking the same, the clamp carried by loose arms depending from said shaft and consisting of a rigid and a pivoted jaw, a spring to draw the clamp toward the cutting apparatus, and a clamp-controlling arm to draw said clamp back, having a movable dog to lock and release the clamp, substantially as described.

10. In a cutting-machine, the combination, with the cutting apparatus and a pressure-gage bar, of a holding and drawing clamp, consisting of a clasp composed of a pair of jaws, arms swinging from a rock-shaft carrying said clamp, a dog or trigger for closing or allowing the clamp to open, and means, substantially as described, for operating said parts, substantially as set forth.

11. In a cutting-machine, the combination of a frame, a cutting apparatus, a rock-shaft, a drawing and holding mechanism consisting of a clamp, comprising rigid and pivoted jaws, arms loose on and depending from said shaft and carrying said clamp, a controlling and operating arm for said clamp, a spring connection between said operating-arm and the shaft, for the purpose set forth, and means, substantially as described, controlling said pivoted jaw.

12. In combination, a work-table, a frame extending above the same, a cutter, a rock-shaft in said frame, a swinging clasp carried by said frame and comprising stationary and pivoted jaws, an arm loose on and depending from said shaft for controlling the swing of said clasp, an arm rigid with said shaft and normally parallel with said loose arm, and a spring yieldingly holding said loosely and rigidly mounted arms together, substantially as and for the purposes set forth, and controlling means, substantially as described, for said pivoted jaw.

13. In a cloth-cutting machine, the combination of a work-table, a frame extending above the same, a drive-shaft, a cutter operated from said shaft, a rock-shaft in said frame, a swinging feeder depending from such rock-shaft, an additional rock-shaft in such frame, a swinging drawer and holder depending from and operated by such additional rock-shaft, said two rock-shafts being connected to operate together by crank-arms and connections, and operating connections from said drive-shaft to one of said rock-shafts, substantially as described.

14. In a cutting-machine, the combination of a work-table, an upright frame above the same, the drive shaft having the cams, a cutter, a lever engaging and operated by one of said cams and connected with said cutter to swing the same, the vertically-movable pressure-gage bar, a frame carrying the same, a lever operated by one of said cams and connected with said gage-bar frame to swing the same, the swinging feeder, a rock-shaft carrying the same mounted in said upright frame, the drawer and holder, a rock-shaft in said upright frame carrying such drawer and holder, and a lever operated by one of said cams and connected to control both of said rock-shafts.

15. In a cutting-machine, the combination of a work-table, a cutter, the feeder on one side of the cutter, the drawer and holder on the opposite side of the cutter, the pressure-gage bar operating in conjunction with such drawer and holder, a vertically-swinging frame, carrying such bar, at the inner side of the cutter, controlling connections for such frame to raise and lower the bar at proper periods, and operating mechanism, substantially as described.

16. In a cloth-cutting machine, the combination of a work-table, a cutter, the vertically-movable pressure-gage bar at inner side of cutter having the lower projecting longitudinal edge to catch the welts in the fabric, a vertically-movable support or carrier for such bar, operating connections and mechanism therefor, the drawer and holder on the opposite side of the cutter comprising a clasp, arranged to operate in conjunction with such bar and to grasp the fabric and draw it beneath the cutter and bar until the bar engages a welt and holds the fabric, and operating connections and mechanisms, substantially as described.

In testimony that I claim the foregoing as my own I affix my signature in presence of two witnesses.

HENRY S. BECKER.

Witnesses:
LOUIS T. HANCKEL,
D. W. BRUNLEY.